United States Patent
Zhang et al.

(10) Patent No.: US 9,121,959 B2
(45) Date of Patent: Sep. 1, 2015

(54) PREDICTING CARBONATE ROCK SOLID PERMITTIVITY

(75) Inventors: Tianhua Zhang, Chatillon (FR);
Jean-Marc Donadille, Chatillon (FR);
Patrice Ligneul, Al-Khobar (SA);
Mahmood Akbar, Al-Khobar (SA)

(73) Assignee: Schlumberger Technology Corporation, Cambridge, MA (US)

( * ) Notice: Subject to any disclaimer, the term of this patent is extended or adjusted under 35 U.S.C. 154(b) by 251 days.

(21) Appl. No.: 13/173,705

(22) Filed: Jun. 30, 2011

(65) Prior Publication Data
US 2013/0006535 A1      Jan. 3, 2013

(51) Int. Cl.
*G01V 3/18* (2006.01)
*G01V 5/08* (2006.01)

(52) U.S. Cl.
CPC .......................................... *G01V 5/08* (2013.01)

(58) Field of Classification Search
CPC .......... E21B 47/00; G01V 11/00; G06F 19/00
USPC .............. 702/8, 11; 324/339, 323; 250/269.6, 250/269.7
See application file for complete search history.

(56) References Cited

U.S. PATENT DOCUMENTS

| | | | |
|---|---|---|---|
| 4,786,873 A * | 11/1988 | Sherman | 324/323 |
| 5,059,907 A * | 10/1991 | Sherman | 324/323 |
| 5,168,234 A * | 12/1992 | Freedman | 324/338 |
| 5,736,637 A * | 4/1998 | Evans et al. | 73/152.31 |
| 5,869,755 A * | 2/1999 | Ramamoorthy et al. | 73/152.05 |
| 7,117,092 B2 * | 10/2006 | Jacobson | 702/8 |
| 7,327,146 B2 * | 2/2008 | Simon | 324/355 |
| 7,363,160 B2 * | 4/2008 | Seleznev et al. | 702/7 |
| 7,532,129 B2 * | 5/2009 | Radzinski | 340/853.1 |
| 7,869,565 B2 * | 1/2011 | Wood et al. | 378/53 |
| 7,880,134 B2 * | 2/2011 | Kirkwood et al. | 250/269.6 |
| 2001/0045279 A1 * | 11/2001 | Converse et al. | 166/246 |
| 2006/0161352 A1 * | 7/2006 | Goswami et al. | 702/11 |
| 2007/0061082 A1 * | 3/2007 | Seleznev et al. | 702/11 |
| 2007/0061083 A1 * | 3/2007 | Habashy et al. | 702/11 |
| 2007/0246649 A1 * | 10/2007 | Jacobi et al. | 250/269.6 |
| 2008/0308720 A1 * | 12/2008 | Ferguson | 250/269.6 |

(Continued)

FOREIGN PATENT DOCUMENTS

WO    WO 2011154712 A1 *  12/2011

OTHER PUBLICATIONS

Benadda, M. D. et al, "Experimental and Theoretical Study of the Dielectric Properties of 1-Cyanoadamantane; Spectrum of the Compact Crystal from Measurements on Powder", J. Phys. D: Appl. Phys., 15, 1982, pp. 1477-1489.

(Continued)

*Primary Examiner* — Mischita Henson
*Assistant Examiner* — Kyle R Quigley
(74) *Attorney, Agent, or Firm* — Bridget Laffey

(57) ABSTRACT

Apparatus and methods for determining the rock solid (matrix) dielectric permittivity for subterranean rocks, such as carbonate rocks, are described. According to some embodiments, this is accomplished by linking the matrix permittivity to the detailed chemical composition of the rock. The linking function is defined by coefficients for each component that can be determined by inversion in a laboratory calibration process such that the function compensates for the permittivity contribution of rock components that may be undetectable through downhole logging procedures.

24 Claims, 4 Drawing Sheets

(56) References Cited

U.S. PATENT DOCUMENTS

| | | | |
|---|---|---|---|
| 2009/0248309 A1* | 10/2009 | Neville et al. | 702/8 |
| 2011/0005762 A1* | 1/2011 | Poole | |
| 2011/0227577 A1* | 9/2011 | Zhang et al. | 324/338 |
| 2012/0119744 A1* | 5/2012 | Habashy et al. | 324/339 |
| 2012/0273273 A1* | 11/2012 | Ligneul et al. | 175/46 |

OTHER PUBLICATIONS

Grau, J. A. et al, "A Geological Model for Gamma-ray Spectroscopy Logging Measurements", Nucl. Geophys., vol. 3, No. 4, 1989, pp. 351-359.

Neelakantaswamy, P. S. et al, "Estimation of Permittivity of a Compact Crystal by Dielectric Measurements on its Powder: A Stochastic Mixture Model for the Powder-Dielectric", J. Phys. D.:P Appl. Phys., 16, 1983, pp. 1785-1779.

Robinson, D. A., "Calculation of the Dielectric Properties of Temperate and Tropical Soil Minerals from Ion Polarizabilities Using the Clausius-Mosotti Equation", Soil Science Society of America, J. 68, 2004, pp. 1780-1785.

Shannon, R. D., "Dielectric Polarizabilities of Ions in Oxides and Fluorides", J. Appl. Physics, 73, No. 1, 1993, pp. 348-366.

* cited by examiner

TABLE 1. THE POLARIZABILITY OF IONS BASED ON DATA TAKEN FROM SHANNON (1993)

| CATIONS (α CUBIC ANGSTROMS) | | | | | | | | | | ANIONS (α CUBIC ANGSTROMS) | | | |
|---|---|---|---|---|---|---|---|---|---|---|---|---|---|
| +1 | | +2 | | +3 | | +4 | | +5 | | −1 | | −2 | |
| Li | 1.20 | Be | 0.19 | B | 0.05 | Si | 0.87 | P | 1.22 | F | 1.62 | O | 2.01 |
| Na | 1.80 | Mg | 1.32 | Al | 0.79 | Ge | 1.63 | As | 1.72 | OH | 2.27 | | |
| K | 3.83 | Zn | 2.04 | Ga | 1.50 | Ti | 2.93 | V | 2.92 | | | | |
| Rb | 5.29 | Ni | 1.23 | Cr | 1.45 | Sn | 2.83 | Nb | 3.97 | | | | |
| Cs | 7.43 | Co | 1.65 | Fe | 2.29 | Zr | 3.25 | Ta | 4.73 | | | | |
| Tl | 7.28 | Fe | 2.23 | In | 2.62 | Ce | 3.94 | | | | | | |
| | | Cu | 2.11 | Sc | 2.81 | U | 4.45 | | | | | | |
| | | Mn | 2.64 | Y | 3.81 | Th | 4.92 | | | | | | |
| | | Ca | 3.16 | Lu | 3.64 | Te | 5.23 | | | | | | |
| | | Sr | 4.24 | Yb | 3.58 | | | | | | | | |
| | | Ba | 6.40 | Tm | 3.82 | | | | | | | | |
| | | Cd | 3.40 | Er | 3.81 | | | | | | | | |
| | | Pb | 6.58 | Ho | 3.97 | | | | | | | | |
| | | Eu | 4.83 | Dy | 4.07 | | | | | | | | |
| | | | | Th | 4.25 | | | | | | | | |
| | | | | Gd | 4.37 | | | | | | | | |
| | | | | Eu | 4.53 | | | | | | | | |
| | | | | Sm | 4.74 | | | | | | | | |
| | | | | Nd | 5.01 | | | | | | | | |
| | | | | Pr | 5.32 | | | | | | | | |
| | | | | La | 6.07 | | | | | | | | |
| | | | | Ce | 6.15 | | | | | | | | |
| | | | | Sh | 4.27 | | | | | | | | |
| | | | | Bi | 6.12 | | | | | | | | |

FIG. 1
PRIOR ART

PREDICTING CARBONATE ROCK SOLID PERMITTIVITY

FIELD

This patent specification generally relates to evaluating properties of a subterranean rock formation surrounding a borehole. More particularly, this patent specification relates to the use of a function or model calibrated by laboratory measurements of dielectric permittivity applied to the downhole composition data to estimate rock solid permittivity in formations such as carbonate or hydrocarbon-bearing shale formations.

BACKGROUND

Dielectric spectroscopy can be used for analyzing rock electrical properties in a wide-range of frequencies. There are mainly three features in a rock system that are used for understanding the dielectric spectroscopy response: the rock solid polarization, fluid polarization, and rock-fluids interaction in the polarization process. However the relationship of these three features is non-linear and still open to research. A commercial multifrequency dielectric scanning service such as performed using Sclumberger's Dielectric Scanner tool can measure the combined rock dielectric spectroscopy response, i.e. dielectric permittivity and the rock formation conductivity at various frequencies. From these physical parameters, reservoir properties such as cementation factor, water saturation and water conductivity, formation shaliness can be estimated by the way of a dielectric mixing law. As the dielectric permittivity values of the rock solid and the fluids are separately entered in the mixing law, preferably they all should be accurately known in order to reliably estimate the reservoir properties.

Wireline logging tools can provide useful compositional data. For example, a gamma ray tool such as Schlumberger's Elemental Capture Spectroscopy (ECS) tool can be used to detect a number of elements that are in high gamma ray detection sensitivity and/or high abundance using gamma ray measurement. However, while a gamma ray logging tool such as an ECS tool can typically detect about 5-7 elements, a typical carbonate reservoir rock may have in excess of 50 elements. In the case where one or more of the compositional elements that are not detected by the gamma ray logging tool turn out to have a relatively high dielectric constant and in certain type of formation in relatively higher abundance, the effect of those elements on rock solid dielectric permittivity has never been published.

It is known that rock dielectric constant can be derived using the polarizabitility of elements within the compound. For example, R. D. Shannon, *Dielectric Polarizabilities of Ions in Oxides and Fluorides*, J. Appl. Physics. 73 (1), January 1993 (hereinafter "Shannon 1993") points out that: "Good agreement between calculated and observed polarizabilities implies that additivity rules employing a sufficiently large set of dielectric oxide polarizabilities or dielectric ion polarizabilities should be useful in predicting dielectric constants of new materials and compounds whose dielectric constant has not been measured." Shannon 1993 discusses derivation of 129 oxides and 25 fluorides polarizabilities using a least squares refinement technique in conjunction with the Clausius-Mosotti equation. Shannon 1993 also teaches that the polarizabilities can be used to estimate mean dielectric constants of "well-behaved" compounds. The frequency used in Shannon 1993 is 1 KHz to 10 MHz. M. D. Benadda, J. C. Carru, J. P. Amoureux, M. Castelain and A. Chapoton, *Experimental and Theoretical Study of the Dielectric Properties of 1-cyanoadamantane*; Spectrum of the Compact Crystal from Measurements on Powder, J. Phys. D: Appl. Phys., 15 pp. 1477-1489, 1982 study the dielectric properties of 1-cyanoadamantane powder in 1 KHz to 1 GHz range. Various mixture equations have been calculated and Bottcher equation for high volume fractions (powder concentration greater than 75%) and Looyenga equation for low volume fractions (powder concentration less than 35%) seem to agree well with the experimental data. P. S. Neelakantaswamy, B. V. R. Chowdari and A. Rajaratnam, *Estimation of Permittivity of a Compact Crystal by Dielectric Measurements on its Powder: A Stochastic Mixture Model for the Powder-Dielectric*, J. Phys. D: Appl. Phys., 16 pp. 1785-1779, 1983 propose a stochastic mixture model to evaluate powder dielectric constant when it is embedded in a medium either air or a non-polar substance. This model is a polynomial form of combination between two medium and supposed to be working for both high and low volume fractions. 1-cyanoadamantane powder has been measured in the same frequency range as Benadda et al and agrees with the model prediction. D. A. Robinson, *Calculation of the Dielectric Properties of Temperate and Tropical Soil Minerals from Ion Polarizabilites using the Clausius-Mosotti Equation*, Soil Sci. Soc. Am. J. 68 pp. 1780-1785, 2004 estimates some soil mineral dielectric constants based on Clausius-Mosotti model for atomic polarizability. Predicated values agree well with measurements on single crystals that were found in the literature (within 10% accuracy).

However, most of the literature focuses on single lithology or oxides permittivity prediction. Although most of earth crusts are composed of oxides, there are oxidization deposition environment where oxygen is rich in the formation during deposition and reduction deposition where formation is undergoing chemical changes without oxygen. In this case, whether the polarizability model mentioned above can be used to describe downhole formation, especially carbonates, is subject to discussion. For carbonates with complex lithology, the documented permittivity is in the vague range of 6.1-9.1. With the application of dielectric spectroscopy in oil industry, an accurate prediction of carbonate solid permittivity with its chemical and mineral composition becomes more and more important to petrophysical interpretations.

SUMMARY

According to some embodiments, methods for evaluating properties of a subterranean rock formation surrounding a borehole are described. The methods include receiving downhole composition data reflecting composition measurements made at one more locations along the borehole of the rock formation surrounding the wellbore; and generating a measure of permittivity associated with the rock formation at the one or more locations based at least in part on a function relating the downhole composition data and the measure of permittivity. According to some embodiments the borehole is a hydrocarbon wellbore in a carbonate or hydrocarbon-bearing shale formation.

According to some embodiments, the downhole composition measurement, which can be made by a tool such as a gamma ray logging tool, are unable to detect one or more missing components of the rock, and the function, which can be linear or non-linear, is adapted to compensate for the contribution of the one or more missing components in the measure of permittivity. The function preferably includes plurality of coefficients that are determined using an inversion process of samples of rock having known compositions.

According to some embodiments, generated measure of permittivity is used to enhance interpretation of measurements made with a dielectric permittivity logging tool.

According to some embodiments, a system for evaluating properties of a subterranean rock formation surrounding a borehole is described. The system includes a first downhole tool adapted to make measurements at one or more locations along the borehole of the rock formation surrounding the wellbore, thereby generating composition data indicating a plurality of compositional components of the rock; and a processing system adapted and programmed to generate a measure of permittivity associated with the rock formation at the one or more locations based at least in part on a function relating the downhole composition data and the measure of permittivity. The function preferably is adapted to compensate for the contribution to the measure of permittivity of one or more components that are not detectable using the first downhole tool.

According to some embodiments, the dry weight percentage of the elements comprising the geological formations is recorded, and each of them is linked to its dielectric permittivity. The dry rock permittivity is estimated using the best appropriate mixing laws (calibration is laboratory), and the results are optimized with minimization of a cost function which contains the relevant elements of the considered rock formation, or Monte Carlo inversion with relevant elements of the considered rock formation.

BRIEF DESCRIPTION OF THE FIGURES

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 1 shows the polarizability of major oxides that comprise most of the material as measured and gathered according to prior art;

DETAILED DESCRIPTION

Figure 2:
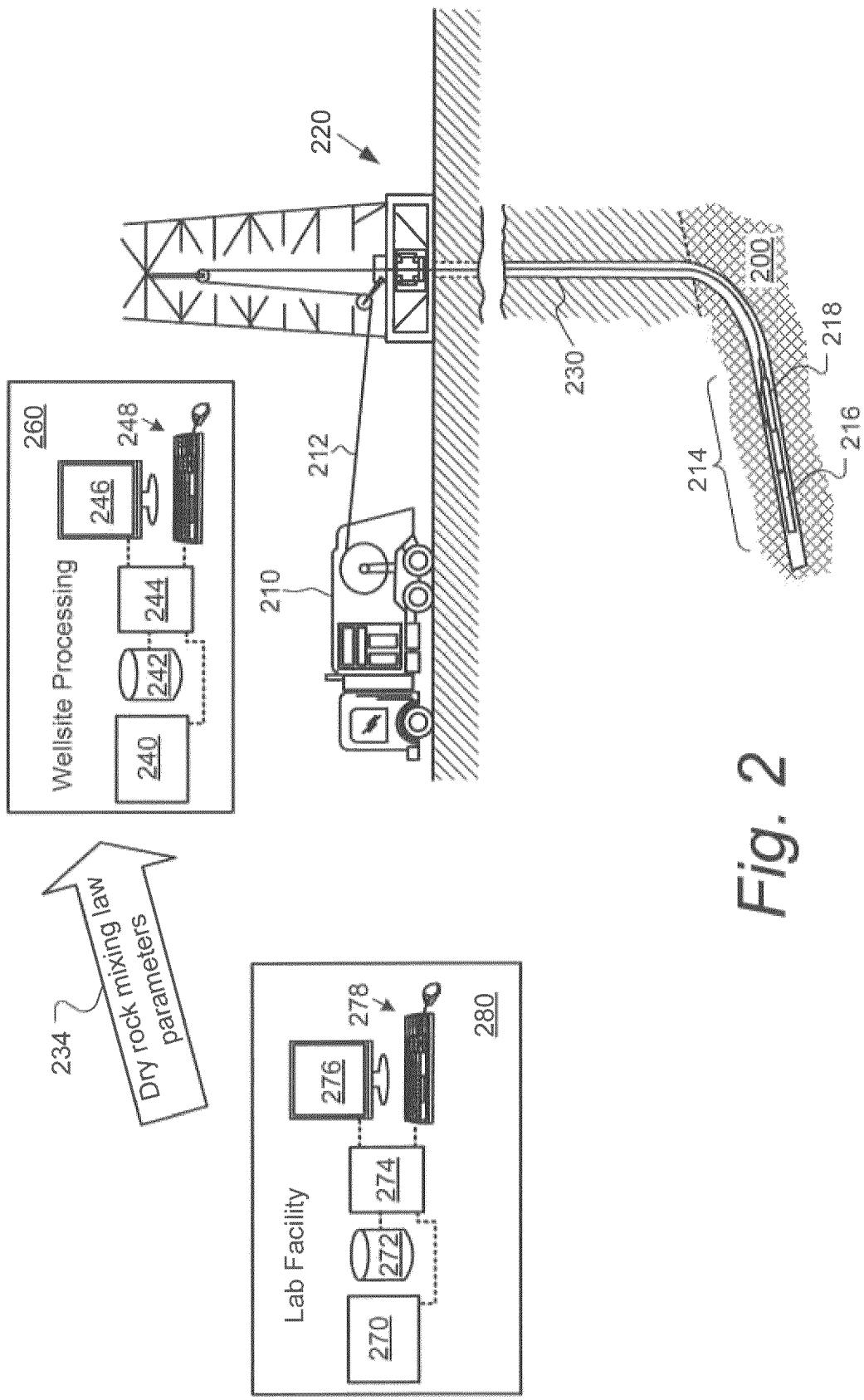
FIG. 2 shows a logging tool being deployed in a wellbore making use of dry rock mixing law calibrated in a lab facility, according to some embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According to some embodiments, a determination of the bulk rock solid (matrix) dielectric permittivity is provided for carbonate rocks. According to some embodiments, this is accomplished by linking the matrix permittivity to the chemical composition of the rock.

As mentioned, Shannon 1993 points out good agreement between calculated and observed polarizabilities, and that additivity rules employing a sufficiently large set of dielectric oxide polarizabilities or dielectric ion polarizabilities should be useful in predicting dielectric constants of new materials and compounds. Accordingly, the bulk rock solid permittivity should be a function of the polarizability of its oxide components. However, the oxide polarizability can only be used to predict molecular polarizability, or the major rock lithology molecules in real carbonate rocks. According to some embodiments, example of workflows is described herein.

The dielectric relative permittivity of a single chemical compound, such as quartz, gypsum, and others, can be estimated using the Clausius-Mosetti equation that relates the dielectric constant $\in_r$ of a single compound to its molecular volume $V_m$ and polarizability $\alpha_D$:

$$\varepsilon_r = \frac{3V_m + 8\pi\alpha_D}{3V_m - 4\pi\alpha_D} \quad (1)$$

Where the molecular polarizability of different species can be linked to individual oxides using the additive law given below:

$$\alpha_D(M_2M'X_4) = 2\alpha_D(MX) + \alpha_D(M'X_2) \quad (2)$$

The two above equations link the measured oxide compound permittivity to the electric polarizability of the oxide ions comprising the crystal molecules. FIG. 1 shows the polarizability of major oxides that comprise most of the material as measured and gathered by Shannon 1993.

However, the polarizability of some other important elements is missing from the available literature. Notably missing is the polarizability of Carbon and Sulfur oxides. As such, using this polarizability model to predict complex carbonate including anhydrite is difficult. Also if the important elements are not existing in oxide form, the assumptions of the above equations are not valid anymore.

The carbonate rock matrix is composed of a large number (e.g. 50-60 or more) of chemical elements. A gamma ray tool, such as the Schlumberger ECS tool, can be used to measure some of these elements by sending neutrons into the rock formation and recording the gamma ray response. The post-processing of this response can provide rock solid chemical information. The weight percentages of the main elements acquired by the ECS tool, for example, includes: Ca, Mg, S, Si, Fe, Gd and Ti. According to some embodiments establishing a relationship between the rock solid dielectric constant and the main chemical elements allows for an estimation of the rock solid permittivity with the existing and future downhole logging suite.

The relative permittivity of rock samples (either dry or saturated) can be measured in a laboratory with a complex permittivity probe attached to a network analyzer, working in reflection or transmission mode.

FIG. 2 shows wireline tools being deployed in a wellbore and a lab analysis facility, according to embodiments. Wireline truck 210 is deploying wireline cable 212 into well 230 via wellsite 220. Wireline toolstring 214 is disposed on the end of the cable 212 in a subterranean rock formation 200. According to some embodiments, formation 200 is carbonate rock reservoir. Toolstring 214, according to some embodiments includes a dielectric scanner logging tool 216 such as Schlumberger's Dielectric Scanner tool. According to some embodiments, toolstring 214 also includes a gamma ray tool 218 such as Schlumbergers ECS tool which makes gamma ray measurements that can be interpreted to indicate certain compositional components of the rock 200. Although the wireline tools 216 and 218 are shown, according to other embodiments, other types of logging tool having compositional measurement capability and/or dielectric measurement capability are used such as conveyed on a drill string (while drilling) and/or conveyed by coiled tubing. Data from the logging tools 214 from rock formation 200 are retrieved at the surface from the tools 214 and interpreted at the wellsite processing facility 260. The processing facility 260 can be located in the logging truck 210 or it can be located in one or more other locations at the wellsite 220. According to some embodiments, the processing and interpretation of the data from the tools 214 is performed at one or more locations remote from the wellsite 220. The processing facility 260 preferably includes one or more central processing units 244, storage system 242, communications and input/output modules 240, a user display 246 and a user input system 248. As will be explained in further detail in FIG. 3 below, the wellsite processing facility 260 preferably makes use of dry rock mixing law parameters 234 that are generated in a lab facility 280. The lab facility 280 also preferably includes one or more central processing units 274, storage system 272, communications and input/output modules 270, a user display 276 and a user input system 278.

According to some embodiments, in the wellsite processing facility 260, the permittivity of the matrix rock formation 200 is estimated locally in the vicinity of the toolstring 214. This information can be associated to the data acquired by logging in the same location with dielectric tool 216 that acquires the complex dielectric permittivity of the rock. The uncertainty in the rock formation permittivity value (that would generally have been entered as an external parameter in the dielectric logging interpretation) can be eliminated by having its elemental composition translated into rock solid permittivity as describe above more fully herein.

The combination of tools such as gamma ray tool 218 and dielectric scanner tool 216 thus gives an in situ downhole measurement of rock solid matrix permittivity, which should then yield more accurate dielectric petrophysical answers in carbonates (such as cementation factor, water saturation and conductivity).

Thus, according to some embodiments workflows and associated systems are provided to accurately estimate carbonates rock solid permittivity from their chemical and mineral compositions. The methods include calibration by laboratory measurements of dielectric permittivity on pure crystals, dry rock plugs and/or rock powder. A main input to the methods are the weight/volume percentage of the chemical elements, and/or mineralogy that form the rock, given (for instance) by the compositional tool (such as the ECS tool) or laboratory geochemical measurements. A specially designed inversion technique is used to setup the relationship between rock chemical and mineralogical compositions and the rock bulk solid permittivity.

Figure 3:
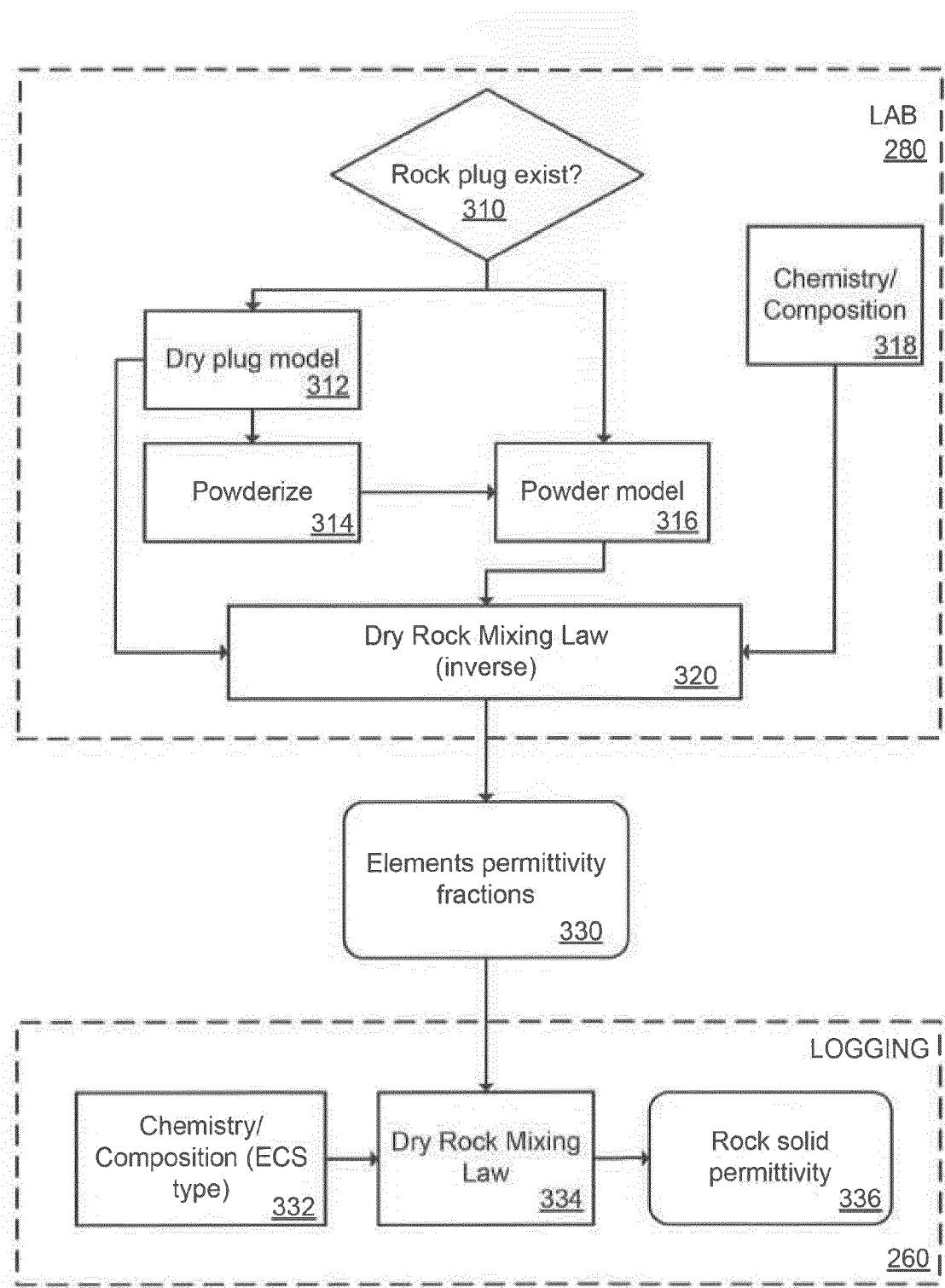
FIG. 3 shows a workflow for estimating carbonate rock solid permittivity, according to some embodiments.

FIG. 3 shows a workflow for estimating carbonate rock solid permittivity, according to some embodiments. The steps outlined with the upper dashed line are performed in a laboratory facility 280 such as described with respect to FIG. 2. Generally, the lab portion of the workflow involves three types of samples: mineral crystals, dry rock plugs and rock powder. The dry plug model 312 and powder model 316 are methodologies that allow obtaining the relative permittivity of a rock from dielectric measurements in the lab (using either a solid rock in the case model 312, or a powder sample in the case of model 316). At step 310 a determination is made as to which types of model (a non-destructive dry plug model and/or a destructive powder model) will be used. If a dry plug sample exists, according to some embodiments, such as from core sampling, it is used for the dry plug model 312. Some of the material is then powderized in step 314 and used for the destructive powder model 316. The results of models 312 and 316 are combined with chemistry/composition data 318 that are obtained for example using geochemical laboratory analysis, to calculate an inverse of a dry rock mixing law 320. The inversion step yields the dry rock mixing law parameters (that correspond to the parameters 234 shown in FIG. 2), which in according to some embodiments are permittivity coefficients x(i) (330) for each element.

According to some embodiments, other sources of sample material can be used instead of, or in addition to the core sample. For example, drilling cuttings can be used for the powder model 316 or if the cuttings are sufficiently large, for the dry plug model as well. According to some embodiments, the techniques described herein can be used in combination with drilling cuttings analysis techniques such as disclosed in co-pending U.S. patent application Ser. No. 13/097,393, filed Apr. 29, 2011 and entitled "Analysis of Drilling Cuttings for Permittivity", which is hereby incorporated by reference herein.

According to some embodiments, where both dry plug modeling 312 and powder modeling 316 is performed, information may be gathered from a discrepancy between the dry plug versus powder dielectric measurements. In cases where the non destructive measurements of dielectric constants are higher than the destructive method measurement, this can be used as an indicator of rock crystal structure size, which can in turn indicate information as to the deposition of the rock, since the non-destructive measurement can be assumed to have preserved the original crystal size. According to some embodiments, the permittivity coefficients x(i) 330 can then be used in a dry rock mixing law 334 to greatly enhance the interpretation of data from a logging operation 260. As discussed below, the dry rock mixing law can be in different forms, including linear or non-linear forms. The dry rock mixing law 334 takes chemistry/composition data, for example, from a gamma ray logging operation such as using an ECS tool, to yield an estimate rock solid permittivity 336 for the location of the composition data 332. This location specific accurate permittivity data 336 can then be used, for example in the analysis of dielectric logging data such as gathered using a logging tool such as the Dielectric Scanner tool.

Thus, according to some embodiments techniques are shown for relating gamma-ray measurements (e.g. using an ECS tool), and dielectric spectroscopy measurements (e.g. using a Dielectric Scanner tool).

In gamma-ray measurements such as when using an ECS tool, the measured capture gamma ray counts are a function of each element that exists in the rock. See, e.g., Grau J A, Schewitzer J S, Ellis D V and Hertzog R C, *A Geological Model for Gamma-ray Spectroscopy Logging Measurements*, Necl. Geophys. Vol. 3 N4, 1989, pp: 351-359.

$$C\overline{R}_P = W I_s [\rho_{bulk} \Phi_n \overline{\Omega V}] N_A \frac{\sigma_c M}{A} \quad (3)$$

Where W is the weight fraction of each chemical element, A is the atomic weight of the element, $\sigma_c$ is the total elemental capture cross section, $\rho_{bulk}$ is the bulk density of the rock. The rest of the parameters are a function of neutron source and gamma ray generation efficiency.

On the other hand, according to Clausius Mosetti Equation (1), the whole rock matrix permittivity can be expressed as an integration of all the mineral molecules that exist in the rock. Thus:

$$\varepsilon_r = \sum_D \left[\left(\frac{3V_m + 8\pi\alpha_D}{3V_m - 4\pi\alpha_D}\right) f_D\right] = \sum_D \left[\left(1 + \frac{12\pi\alpha_D}{3V_m - 4\pi\alpha_D}\right) f_D\right] \quad (4)$$

In which D represents all the molecular species that exist in the rock and $f_D$ is a fraction of each species, not necessarily volumetric fraction. The molecular volume is:

$$V_m = \frac{W_m}{N_A \rho_m} \quad (5)$$

Where m stands for molecular species of each mineral. Suppose the relationship between rock bulk density $\rho_{bulk}$ and that of the density from each molecular species $\rho_m$ has the following relationship:

$$\rho_{bulk} = \sum_D (f_D \rho_m C) \quad (6)$$

Where C is a constant. Equation (4) can then be expressed as:

$$\varepsilon_r = \sum_D f_D + 4\pi \sum_D \left(\frac{1}{\frac{W_m}{N_A \rho_m \alpha_D f_D} - \frac{4\pi}{3 f_D}}\right) \quad (7)$$

$$= \sum_D f_D + 4\pi \sum_D \left(\frac{1}{\frac{W_m}{C N_A \rho_{bulk} \alpha_D} - \frac{4\pi}{3 f_D}}\right)$$

On the other hand, bulk density can be expressed as a function of total capture gamma ray counts as:

$$\rho_{bulk} = \frac{C\overline{R}_{total}}{I_s \phi_n \overline{\Omega V} N_A M \sum_i \frac{W_i \sigma_c}{A_i}} \quad (8)$$

In which the index i represents each element species comprising the rock, e.g. Ca, Mg, Si etc.

Combining equation (7) and (8), taking into consideration that Clausius Mosetti Equation has the assumption of spherical solid polarizability; the rock permittivity can be related to weight percentage of its elements in the following form:

$$\varepsilon_r = x(1) + \frac{1}{\sum_{i=2}^{n}(W_i x(i)) - x(1)} \quad (9)$$

Thus, according to some embodiments, equation (9) provides an example of a non-linear dry rock mixing law that relates rock bulk permittivity to the rock's chemical composition.

According to some other embodiments, a linear model of a dry rock mixing law is provided. A linear combination of rock solid chemical composition by a lab defined fraction factor, can be expressed as follows.

$$\varepsilon_r = \sum_{i=1}^{n}(W_i x(i)) \quad (10)$$

We consider that a rock is composed of M chemical elements $el_1$ . . . , $el_M$ (e.g. Calcium, Magnesium etc. . . . ). A mixing law for the estimation of the dry rock permittivity from its elemental composition takes two inputs. The first input is the dry weight percentage of the elements expressed as the row vector: $Dw=[Dw_{el1}, \ldots, Dw_{elM}]$. This input is provided by a chemical analysis of the rock. The chemical analysis is preferably determined by spectroscopy, which can be done both in the lab and downhole using a logging tool such as the gamma-ray ECS tool. The second input is the non-normalized permittivity fraction of each element is expressed as the column vector: $x=[x_1, \ldots, x_M]^T$, where the superscript indicates transposition.

The mixing law output is the matrix relative permittivity $\in_r$ of the rock described by its chemical composition Dw. An important point to mention here is that the output is the solid, or matrix-only permittivity value of the rock (as opposed to the bulk permittivity).

One example of the mixing law form is shown in Equation (9), which is a non-linear form. Another reasonable choice for the dry rock mixing law is the element averaging scheme: $\in_r=Dw*x$, shown in Equation (10), which is a linear form. However, according to other embodiments other linear and nonlinear functions $\in_r=f(Dw, x)$ can be used.

In the lab we can take dielectric permittivity measurements of N rock samples, using the dry plug model 312 and/or the powder model 316. These measurements are given in vector form: $\in_{r,meas} = [\in_{r,1}, \ldots, \in_{r,N}]^T$. From Elemental Spectroscopy measurement or geochemical measurement we also know the element composition Dw, of the i-th sample, i=1 . . . N.

The purpose of the lab measurements is to estimate, for example by least-square regression or inversion, or Monte Carlo inversion scheme, the non-normalized permittivity fraction of all the considered elements. Indeed if we introduce the dry rock mixing law prediction for the N samples: $\in_{r,pred}(x) = [f(Dw_1, x), \ldots, f(Dw_N, x)]^T$, then the exercise simply consists of finding x that minimizes the mismatch between $\in_{r,meas}$ and $\in_{r,pred}$.

For example, using a least-square inversion framework this can be achieved by minimizing the following cost functional for the variable x:

$$C = (\in_{r,meas} - \in_{r,pred}(X)) \cdot C_D^{-1} \cdot (\in_{r,meas} - \in_{r,pred}(X))$$

Where $C_D$ is the N*N covariance matrix that represents the observational uncertainties.

Therefore the main output of the lab experiments (FIG. 3) is the set $x_{opt}$ of permittivity fractions for all the considered elements.

Finally a logging tool such as the gamma ray ECS tool provides the dry weight percentage of the elements comprising the geological formations in the form of continuous logs: $Dw_{log}$. The main application of the dry rock mixing law $f(Dw_{log}, x_{opt})$ is to provide the formation matrix permittivity as an in-situ downhole log.

In the case where only lithology of rock major molecules are measured, an arithmetic average of the molecular polarizability (shown in Equation (1)) can be used as a supplementary equation for the chemistry dry rock mixing law.

Thus, using the techniques described herein a greatly enhanced estimate of rock solid permittivity can be obtained for rock formations such as carbonate rock where there are typically at least 50-60 elements, even where downhole logging compositional analysis can only measure a small subset of the elements (e.g. 7 elements in case of gamma-ray compositional logging). This is particularly useful if one or more of the elements that is not detected using compositional logging has a relatively high dielectric constant (e.g. manganese, copper, barium, strontium . . . ) which could otherwise be large potential sources of error.

According to some embodiments, the enhanced accuracy of rock solid permittivity can be used in the geology field, such as for dynamic reservoir rock typing (e.g. the existence of certain special chemical elements, and/or crystal structure size relating to certain depositional environment), and/or in the petrophysics field, such as for improved saturation estimation.

Figure 4:
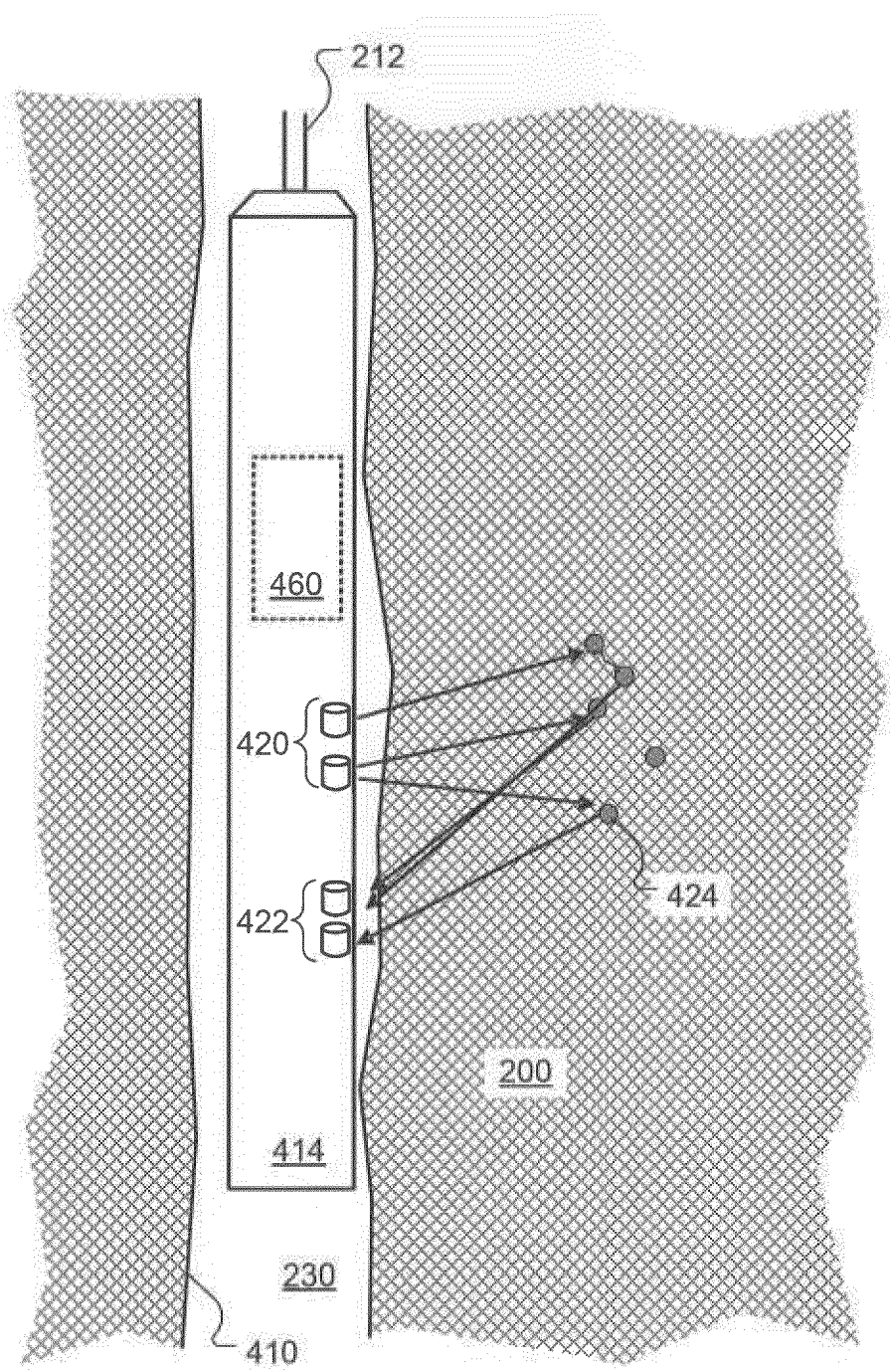
FIG. 4 is a block diagram of a logging sonde for making rock solid permittivity measurements, according to some embodiments.

FIG. 4 is a block diagram of a logging sonde for making rock solid permittivity measurements, according to some embodiments. Logging sonde 414 is deployed in a borehole 230 within subterranean rock formation 200. Borehole 230 is uncased and has borehole wall 410. According to some embodiments, formation 200 is a carbonate formation. The sonde 414 uses transmitters 420 to send high energy neutrons into the formation 200 and measures scattered gamma ray via receivers 422. In the downhole processing module 460, the scattered gamma ray measurements are inverted to determine the solid composition for formation 200. The inverse composition is combined with the mixing law module running within processing module 460. The mixing law module uses the teachings described herein and is analogous to the surface processing center 260 shown in FIG. 2. The processing module thus determines, downhole, a real time rock sold permittivity measurement with high resolution.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A computer implemented method of evaluating properties of a subterranean rock formation surrounding a borehole comprising:
   receiving composition data reflecting downhole composition measurements made using a gamma ray logging tool at one more locations along the borehole of the rock formation surrounding the wellbore;
   generating a measure of the rock solid permittivity associated with the rock formation at the one or more locations based at least in part on a function relating the downhole composition data and the measure of the rock solid permittivity;
   wherein the composition data indicates a plurality of compositional components of the rock that are detectable using the composition measurements, and the function is adapted to compensate, in the measure of the rock solid permittivity, for the contribution of the one or more components that are not detectable using the composition measurements; and
   wherein the composition data indicates chemical and/or lithology composition of the subterranean rock formation at the one or more locations.

2. A method according to claim 1 wherein the borehole is a hydrocarbon wellbore.

3. A method according to claim 1 wherein the subterranean rock formation is a hydrocarbon bearing rock formation.

4. A method according to claim 1 wherein the function relating the downhole composition data and the measure of rock solid permittivity is linear.

5. A method according to claim 1 wherein the function relating the downhole composition data and the measure of rock solid permittivity is non-linear.

6. A method according to claim 1 wherein the function relating the downhole composition data and the measure of rock solid permittivity includes a plurality of coefficients, each coefficient associated with a compositional component.

7. A method according to claim 1 wherein the receiving and generating are carried out in a logging tool while downhole, and the logging tool is used to make the composition measurements.

8. A method according to claim 1 further comprising generating an interpretation based in part on measurements made with a dielectric permittivity logging tool and in part on the generated measure of rock solid permittivity.

9. A method according to claim 1 further comprising performing reservoir rock typing of the subterranean rock formation at the one or more locations based in part on measurements made with a dielectric permittivity logging tool and in part on the generated measure of rock solid permittivity.

10. A method according to claim 1 further comprising estimating saturation associated with the subterranean rock formation at the one or more locations based in part on measurements made with a dielectric permittivity logging tool and in part on the generated measure of rock solid permittivity.

11. A system for evaluating properties of a subterranean rock formation surrounding a borehole comprising a processing system adapted and programmed to carry out a method according to claim 1.

12. A method according to claim 6 wherein the coefficients include components detectable by the composition measurements.

13. A method according to claim 6 wherein the coefficients are determined using an inversion process performed involving samples of rock having known compositions.

14. A method according to claim 6 wherein the coefficients are determined in a facility remote from the borehole prior to the receiving of the downhole composition data.

15. A method according to claim 6 wherein the coefficients are generated in a process comprising:
  recording dry weight/volume values of each of the compositional components;
  linking each of the compositional components to a dielectric permittivity value;
  estimating a dry rock permittivity using mixing laws; and
  optimizing the plurality of coefficients through minimization of error with the estimated dry rock permittivity.

16. A method according to claim 3 wherein the subterranean rock formation is a carbonate formation.

17. A method according to claim 3 wherein the subterranean rock formation is hydrocarbon-bearing shale formation.

18. A method according to claim 17 wherein the subterranean rock formation is of a type selected from a group consisting of: gas shale and oil-bearing shale.

19. A method according to claim 12 wherein the coefficients account for components not detectable by the downhole composition measurements.

20. A method according to claim 13 wherein the samples of rock result from one or more downhole core samples.

21. A computer implemented system for evaluating properties of a subterranean rock formation surrounding a borehole comprising:
  a first downhole tool including a gamma ray logging tool adapted to make measurements at one more locations along the borehole of the rock formation surrounding the wellbore, thereby generating composition data indicating a plurality of compositional components of the rock;
  a processing system adapted and programmed to generate a measure of rock solid permittivity associated with the rock formation at the one or more locations based at least in part on a function relating the downhole composition data and the measure of rock solid permittivity;
  wherein the plurality of compositional components indicated by the composition data include one or more components of the rock that are detectable using the first downhole tool, and the function is adapted, in the measure of rock solid permittivity, to compensate for the contribution of one or more components that are not detectable using the first downhole tool; and
  wherein the composition data indicates chemical and/or lithology composition of the subterranean rock formation at the one or more locations.

22. A system according to claim 21 wherein the processing system is located within the first downhole tool such that the measure of rock solid permittivity can be generated in real time while the tool is downhole.

23. A system according to claim 21 further comprising a second downhole tool adapted to make measurements at one or more locations along the borehole of the rock formation surrounding the wellbore, thereby generating dielectric data, and wherein the generated measure of rock solid permittivity is based in part on the dielectric data.

24. A system according to claim 21 wherein the first and second downhole tools are adapted to be run in the borehole together in a single tool string.

* * * * *